United States Patent
Debras et al.

(10) Patent No.: US 6,221,982 B1
(45) Date of Patent: Apr. 24, 2001

(54) PRODUCTION OF POLYETHYLENE HAVING A BROAD MOLECULAR WEIGHT DISTRIBUTION

(75) Inventors: Guy Debras, Frasnes-les-Gosselies; Michel Messiaen, Waterloo, both of (BE)

(73) Assignee: Fina Research, S.A., Feluy (BE)

(*) Notice: Subject to any disclaimer, the term of this patent is extended or adjusted under 35 U.S.C. 154(b) by 0 days.

(21) Appl. No.: 09/161,253

(22) Filed: Sep. 26, 1998

(30) Foreign Application Priority Data

Sep. 27, 1997 (EP) .................................. 97202971

(51) Int. Cl.[7] .............................. C08F 2/01; C08F 4/44; C08F 9/10
(52) U.S. Cl. ............................. 526/64; 526/73; 526/116; 526/119; 526/123.1; 526/160; 526/943; 526/352; 526/348.5; 526/348.6; 502/104; 502/152
(58) Field of Search .................. 526/64, 66, 68, 526/69, 70, 73, 160, 943, 348.6, 352, 348.5, 119, 116, 123.1

(56) References Cited

U.S. PATENT DOCUMENTS 5,276,115  1/1994  Bohmer et al. .

5,684,097 * 11/1997 Palmroos et al. ..................... 526/64

FOREIGN PATENT DOCUMENTS

| 0288226 | 10/1988 | (EP) | ............................... C08F/10/00 |
| WO 96/02583 | * 2/1996 | (WO) . | |
| 9602583 | 2/1996 | (WO) | ........................... C08F/295/00 |

* cited by examiner

*Primary Examiner*—David Wu
*Assistant Examiner*—R. Harlan
(74) *Attorney, Agent, or Firm*—Jim D. Wheelington

(57) ABSTRACT

A process for producing high density polyethylene in the presence of a Ziegler-Natta catalyst system in two liquid full loop reactors in series, wherein in a first reactor a first polyethylene product is polymerized substantially by homopolymerization of ethylene and hydrogen, optionally with a minor degree of copolymerization of ethylene with an alpha-olefinic comonomer comprising from 3 to 8 carbon atoms, and in a second reactor serially connected to the first reactor downstream thereof a second polyethylene product is copolymerized from ethylene and an alpha-olefinic comonomer comprising from 3 to 8 carbon atoms, and a hydrogenation catalyst is introduced into the reactants downstream of the first reactor.

22 Claims, No Drawings

PRODUCTION OF POLYETHYLENE HAVING A BROAD MOLECULAR WEIGHT DISTRIBUTION

BACKGROUND OF THE INVENTION

The present invention relates to a process for the production of polyethylene in particular high density polyethylene (HDPE) having a bimodal molecular weight distribution.

DESCRIPTION OF THE PRIOR ART

For polyethylene, and for high density polyethylene (HDPE) in particular, the molecular weight distribution (MWD) is a fundamental property which determines the properties of the polymer, and thus its applications. It is generally recognised in the art that the molecular weight distribution of a polyethylene resin can principally determine the physical, and in particular the mechanical, properties of the resin and that the provision of different molecular weight polyethylene molecules can significantly affect the rheological properties of the polyethylene as a whole.

Since an increase in the molecular weight normally improves the physical properties of polyethylene resins, there is a strong demand for polyethylene having high molecular weight. However, it is the high molecular weight molecules which render the polymers more difficult to process. On the other hand, a broadening in the molecular weight distribution tends to improve the flow of the polymer when it is being processed at high rates of shear. Accordingly, in applications requiring a rapid transformation employing quite high inflation of the material through a die, for example in blowing and extrusion techniques, the broadening of the molecular weight distribution permits an improvement in the processing of polyethylene at high molecular weight (this being equivalent to a low melt index, as is known in the art). It is known that when the polyethylene has a high molecular weight and also a wide molecular weight distribution, the processing of the polyethylene is made easier as a result of the low molecular weight portion and also the high molecular weight portion contributes to a good impact resistance for the polyethylene film. A polyethylene of this type may be processed utilising less energy with higher processing yields.

The molecular weight distribution can be completely defined by means of a curve obtained by gel permeation chromatography. Generally, the molecular weight distribution is defined by a parameter, known as the dispersion index D, which is the ratio between the average molecular weight by weight (Mw) and the average molecular weight by number (Mn). The dispersion index constitutes a measure of the width of the molecular weight distribution. For most applications, the dispersion index varies between 10 and 30.

It is known in the art that it is not possible to prepare a polyethylene having a broad molecular weight distribution and the required properties simply by mixing polyethylenes having different molecular weights.

As discussed above, high density polyethylene consists of high and low molecular weight fractions. The high molecular weight fraction provides good mechanical properties to the high density polyethylene and the low molecular weight fraction is required to give good processability to the high density polyethylene, the high molecular weight fraction having relatively high viscosity which can lead to difficulties in processing such a high molecular weight fraction. In a bimodal high density polyethylene, the mixture of the high and low melting weight fractions is adjusted as compared to a monomodal distribution so as to increase the proportion of high molecular weight species in the polymer. This can provide improved mechanical properties.

It is accordingly recognised in the art that it is desirable to have a bimodal distribution of molecular weight in the high density polyethylene. For a bimodal distribution a graph of the molecular weight distribution as determined for example by gel permeation chromatography, may for example include in the curve a "shoulder" on the high molecular weight side of the peak of the molecular weight distribution.

The manufacture of bimodal polyethylene is known in the art. It is known in the art that in order to achieve a bimodal distribution, which reflects the production of two polymer fractions, having different molecular weights, two catalysts are required which provide two different catalytic properties and establish two different active sites. Those two sites in turn catalyse two reactions for the production of the two polymers to enable the bimodal distribution to be achieved. Currently, as has been known for many years, as exemplified by EP-A-0057420, the commercial production of bimodal high density polyethylene is carried out by a two step process, using two reactors in series. In the two step process, the process conditions and the catalyst can be optimised in order to provide a high efficiency and yield for each step in the overall process.

In the applicant's earlier WO-A-95/10548 and WO-A-95/11930, it was proposed to use a Ziegler-Natta catalyst to produce polyethylene having a bimodal molecular weight distribution in a two stage polymerisation process in two liquid full loop reactors in series. In the polymerisation process, the comonomer is fed into the first reactor and the high and low molecular weight polymers are produced in the first and second reactors respectively. The introduction of comonomer into the first reactor leads to the incorporation of the comonomer into the polymer chains in turn leading to the relatively high molecular weight fraction being formed in the first reactor. In contrast, no comonomer is deliberately introduced into the second reactor and instead a higher concentration of hydrogen is present in the second reactor to enable the low molecular weight fraction to be formed therein.

These prior processes suffer from the technical disadvantages that some unreacted comonomer can pass through from the first reactor to the second reactor thereby to react with the ethylene monomer therein leading to an increase in the molecular weight of the fraction produced in the second reactor. This in turn can deteriorate the bimodality of the molecular weight distribution of the combined high and low molecular weight polymers leading to a reduction in mechanical properties.

SUMMARY OF THE INVENTION

The present invention aims to provide a process for producing polyethylene having a large molecular weight distribution, and in particular a bimodal molecular weight distribution, which overcomes or at least mitigates some of the problems in the prior art discussed above.

Accordingly, the present invention provides a process for producing high density polyethylene in the presence of a Ziegler-Natta catalyst system in two liquid full loop reactors in series, wherein in a first reactor a first polyethylene product is polymerised substantially by homopolymerisation of ethylene and hydrogen, optionally with a minor degree of copolymerisation of ethylene with an alpha-olefinic comonomer comprising from 3 to 8 carbon atoms, and in a second reactor serially connected to the first reactor downstream thereof a second polyethylene product is copolymerised from ethylene and an alpha-olefinic comonomer comprising from 3 to 8 carbon atoms, and a hydrogenation catalyst is introduced into the reactants downstream of the first reactor.

Preferably, the hydrogenation catalyst is introduced into the process stream passing from the first reactor to the second reactor.

The degree of copolymerisation in the first reactor is preferably limited to an amount whereby the first polyethylene product has a density of not less than 0.960 g/cc.

DETAILED DESCRIPTION OF THE PREFERRED EMBODIMENTS

The present invention is predicated on the surprising discovery by the present inventor that the production of, respectively, low and high molecular weight fractions of a polyethylene in first and second reactors of two liquid full loop reactors in series can unexpectedly yield high density polyethylene having a bimodal molecular weight distribution with improved mechanical properties.

Without being bound by theory, it is believed that this unexpected technical effect results from the absence, or presence in only minor amounts, of comonomer in the first reactor, leading to reliable polymerisation of the low molecular weight polyethylene fraction therein, and the addition of substantial comonomer to the second reactor in conjunction with the consumption of hydrogen prior to or entering the second reactor to form ethane as a result of the addition of the hydrogenation catalyst leads to reliable copolymerisation of the high molecular weight polyethylene fraction having good mechanical properties.

In the preferred process of the present invention, the homopolymerisation and copolymerisation processes are carried out in the liquid phase in an inert diluent, the reactants comprising ethylene and hydrogen for homopolymerisation and for copolymerisation ethylene and an alpha-olefinic comonomer comprising from 3 to 8 carbon atoms. The comonomer may be selected from 1-butene, 1-pentene, 1-hexene, 4-methyl 1-pentene, 1-heptene and 1-octene. The inert diluent may comprise isobutane.

The homopolymerisation and copolymerisation processes are preferably carried out at a temperature of from 50 to 120° C., more preferably from 60 to 110° C., under an absolute pressure of 1 to 100 bar. Typically, the homopolymerisation in the first reactor is carried out a higher temperature than the copolymerisation in the second reactor.

In the first reactor, the ethylene monomer preferably comprises from 0.1 to 3% by weight based on the total weight of the ethylene monomer in the inert diluent and the hydrogen comprises from 0.1 to 2 mol % on the same basis. A particularly preferred composition in the first reactor comprises 1% by weight ethylene and 0.8 mol % hydrogen. If a minor degree of copolymerisation is also carried out in the first reactor, an alpha-olefinic comonomer as described above is also introduced into the first reactor. The proportion of comonomer introduced is limited to an amount whereby the density of the polyethylene produced in the first reactor is at least 0.96 g/cc. The polymerisation product from the first reactor preferably has a melt index MI2 of from 5 to 200 g/10 min, more preferably from 25 to 100 g/10 min, the melt index MI2 being measured determined using the procedures of ASTM D1238 using a load of 2.16 kg at a temperature of 190° C. The melt index MI2 is broadly inversely indicative of the molecular weight of the polymer. In other words, a low melt index is indicative of a high molecular weight for the polyester and vice versa. Typically, the polyethylene produced in the first reactor has a density of over 0.96 g/cc, more typically around 0.97 g/cc. Preferably, the low molecular weight polyethylene fraction produced in the first reactor comprises from 30 to 70% by weight, more typically around 50% by weight, of the total polyethylene produced in the first and second serially connected reactors.

In the second reactor, the comonomer as described above is introduced in substantial amounts, as compared to the first reactor, into the second reactor and in addition a hydrogenation catalyst, having a low activity with respect to the polymerisation of polyethylene, is introduced downstream of the first reactor, preferably into the process stream passing from the first reactor to the second reactor. The hydrogenation catalyst acts to consume hydrogen gas in that process stream thereby to form ethane, thereby in turn to reduce the hydrogen concentration in the second reactor, preferably substantially to zero. Accordingly, in the copolymerisation process carried out in the second reactor, the comonomer, which is typically 1-hexene, is reacted with the ethylene monomer to form a high molecular weight polyethylene fraction in the second reactor in a controllable manner.

Preferably, the temperature in the second reactor is lower than that in the first reactor, for example the temperature is 75° C. in the second reactor as opposed to 100° C. in the first reactor. The ethylene monomer preferably comprises from 0.1 to 2% by weight, typically around 0.8% by weight, and the comonomer comprises from 1 to 3% by weight, typically around 2% by weight, each based on the total weight of the monomer and comonomer in the inert diluent.

The hydrogenation catalyst preferably comprises a metallocene catalyst of general formula:

$Cp_2MX_n$ where

Cp is a substituted or unsubstituted cyclopentadienyl group; M is a transition metal from Group IVB of the Periodic Table of vanadium; X is a halogen or a hydrocarbyl group having from 1 to 10 carbon atoms; and n is the valency of the metal M minus 2.

A particularly preferred metallocene catalyst comprises $Cp_2TiCl_2$.

The metallocene catalyst is injected into the process stream in a preferred amount of from 2 to 50 ppm by weight, more preferably from 2 to 20 ppm based on the weight of the inert diluent.

The final polyethylene, comprising in admixture the low molecular weight polyethylene fraction produced in the first reactor and conveyed through the second reactor and the high molecular weight polyethylene fraction produced in the second reactor, preferably has a high load melt index (HLMI), determined using the procedures of ASTM D1238 using a load of 21.6 kg at a temperature of 190° C., of from 5 to 40 g/10 mins, more preferably from 10 to 15 g/10 mins. The melt index MI2 of the final product may range from 0.05 to 1.0 g/10 mins, preferably from 0.1 to 0.5 g/10 mins. Preferably, the final product has a shear response (SR2), this being a ratio between the HLMI and the MI2 values and representative of the processability of the polyethylene resins produced in accordance with the process of the invention, of from 50 to 180, more preferably from 60 to 130. Preferably, the final product has a density of from 0.935 to 0.955 g/cc, more preferably from 0.940 to 0.950 g/cc. The final product may have a molecular weight distribution MWD (the ratio of $M_w/M_n$) of from 10 to 20.

It has been found that the process of the present invention can yield bimodal high density polyethylenes having properties which make them particularly suitable for use as polyethylene resins for the manufacture of pipes. Since no comonomer is incorporated into the low molecular weight fraction, even if the polymer as a whole has the same molecular weight distribution as in a known polymer the resultant polymer can have improved mechanical properties. Thus the clear distinction in the production of the low and high molecular weight fractions in the process of the invention gives improved bimodality of the molecular weight distribution which in turn improves the mechanical properties such as the impact resistance of the polyethylene resin when used for pipes.

The Ziegler-Natta catalyst preferably consists of a transition metal component (compound A) which is the reaction product of an organomagnesium compound with a titanium compound and an organoaluminium component (compound B).

As transition metal compounds suitable for the preparation of component A, there are used tetravalent halogenated titanium compounds, preferably titanium compounds of the general formula $TiX_n(OR)_{4-n}$ in which n is 1 to 4, X stands for chlorine or bromine, and R for identical or different hydrocarbon radicals, especially straight-chain or branched alkyl groups having 1 to 18, preferably 1 to 10, carbon atoms.

Examples thereof are:

$TiCl_4$, $Ti(OC_2H_5)_2Cl_2$, $Ti(OC_2H_5)_3Cl$, $Ti(OC_3H_7)_2Cl_2$, $Ti(OC_3H_7)_3Cl$, $Ti(OiC_3H_7)_2Cl_2$, $Ti(OiC_3H_7)_3Cl$, $Ti(OiC_4H_9)_2Cl_2$, $Ti(OiC_4H_9)_3Cl$

In some cases, it may be advantageous to prepare the halogeno-ortho-titanic acid esters of the above formula the situ by reacting the respective ortho-titanic acid ester with $TiCl_4$ in a corresponding proportion.

This reaction is advantageously carried out at temperatures of from 0 to 200° C., the upper temperature limit being determined by the decomposition temperature of the tetravalent halogenated titanium compound used; it is advantageously carried out at temperatures of from 60 to 120° C.

The reaction may be effected in inert diluents, for example aliphatic or cycloaliphatic hydrocarbons as are currently used for the low pressure process such as butane, pentane, hexane, heptane, cyclohexane, methyl-cyclohexane as well as aromatic hydrocarbons, such as benzene or toluene; hydrogenated Diesel oil fractions which have been carefully freed from oxygen, sulphur compounds and moisture are also useful.

Subsequently, the reaction product of magnesium alcoholate and tetravalent halogenated titanium compound which is insoluble in hydrocarbons is freed from unreacted titanium compound by washing it several times with one of the above inert diluents in which the titanium-(IV)-compound used is readily soluble.

For preparing component A, magnesium alcoholates, preferably those of the general formula $Mg(OR)_2$ are used, in which R stands for identical or different hydrocarbon radicals, preferably straight-chain or branched alkyl groups having 1 to 10 carbon atoms; magnesium alcoholates having alkyl groups from 1 to 4 carbon atoms are preferred. Examples thereof are $Mg(OCH_3)_2$, $Mg(OC_2H_5)_2$, $Mg(OC_3H_7)_2$, $Mg(Oic_3H_7)_2$, $Mg(OC_4H_9)_2$, $Mg(OiC_4H_9)_2$, $Mg(OCH_2-CH_2-C_6H_5)_2$.

The magnesium alcoholates can be prepared by known methods, for example by reaction magnesium with alcohols, especially monohydric aliphatic alcohols.

Magnesium alcoholates of the general formula X—Mg—OR in which X stands for halogen, $(SO_4)_{1/2}$ carboxylate, especially acetate of OH, and R has the above remaining, may also be used.

These compounds are, for example, obtained by reacting alcoholic solutions of the corresponding anhydrous acids with magnesium.

The titanium contents of component A may be within the range of from 0.05 to 10 mg.-atom per gram of component A. It can be controlled by the reaction time, the reaction temperature and the concentration of the tetravalent halogenated titanium compound used.

The concentration of the titanium component fixed on the magnesium compound is advantageously in the range of from 0.005 to 1.5 mmol, preferably from 0.03 to 0.8 mmol, per litre of dispersing agent or reactor volume. Generally, even higher concentrations are possible.

The organo-aluminium compounds used may be reaction products of aluminium-trialkyl or aluminium-dialkyl hydrides with hydrocarbon radicals having 1 to 16 carbon atoms, preferably $Al(iBu)_3$ or $Al(iBu)_2H$ and diolefins containing 4 to 20 carbon atoms, preferably isoprene; for example aluminium isoprenyl.

Furthermore, suitable as components B are chlorinated organo-aluminium compounds, for example dialkyl-aluminium monochlorides of the formula $R_2AlCl$ or alkyl-aluminium sesquichlorides of the formula $R_3Al_2Cl_3$, in which formulae R stands for identical or different hydrocarbon radicals, preferably alkyl groups having 1 to 16 carbon atoms, preferably 2 to 12 carbon atoms, for example $(C_2H_5)_2AlCl$, $(iC_4H_9)_2AlCl$, or $(C_2H_5)_3Al_2Cl_3$.

It is advantageous to use, as component B, aluminium-trialkyls of the formula $AlR_3$ or aluminium-dialkyl hydrides of the formula $AlR_2H$, in which formulae R stands for identical or different hydrocarbons, preferably alkyl groups having 1 to 16, preferably 2 to 6, carbon atoms, for example $Al(C_2H_5)_3$, $Al(C_2H_5)_2H$, $Al(C_3H_7)_3$, $Al(C_3H_7)_2H$, $Al(iC_4H_9)_3$, or $Al(iC_4H_9)_2H$.

The organoaluminium may be used in a concentration of from 0.5 to 10 mmol per litre of reactor volume.

Optionally, a cocatalyst such as a triethylaluminium (TEAL) is employed in the first reactor, for example in an amount of around 250 ppm by weight based on the weight of the inert diluent.

The process of the invention will now be described in greater detail with reference to the following non-limiting Example.

EXAMPLE 1

The process of the present invention was carried out in two serially connected liquid full loop reactors. In the first reactor, ethylene was polymerised with hydrogen in the presence of isobutane as a inert diluent and the amounts of the ethylene, hydrogen and isobutane are specified in Table 1. No comonomer was present. The catalyst comprised a magnesium dichloride-supported titanium Ziegler-Natta type catalyst including 6.5 wt % Ti, 13.8 wt % Mg and 51.4 wt % Cl, together with a cocatalyst of TEAL in the amount specified in Table 1.

The properties of the polyethylene resin produced by reactor 1 were analysed and it may be seen from Table 1 that the polyethylene resin had a melt index MI2 of around 62 g/10 mins, this representing a relatively low molecular weight for the polymer, yet a relatively high density of greater than 0.97 g/cc. Reactor 1 produced around 50% by weight of the total amount of the final polyethylene resin product produced by both reactor 1 and reactor 2.

The polymerisation was carried out at a temperature of around 100° C. and at a pressure of around 42 bar.

Thereafter, the process stream, including the polyethylene resin produced in the first reactor and the catalyst, was conveyed to the second reactor which was operated under polymerisation conditions having a lower temperature, of around 75° C., than that employed in the first reactor and a pressure of around 42 bar. Prior to entry into the second reactor, a metallocene catalyst, in particular $Cp_2TiCl_2$, was introduced into the process stream in the amount specified in Table 2. It may be seen from Table 1 that this addition of the metallocene catalyst caused hydrogenation of the ethylene by the hydrogen content in the process stream thereby to form ethane, whereby in the second reactor there was no hydrogen remaining. A comonomer in the form of 1-hexene was introduced into the second reactor in the amount specified in Table 1.

The polymerisation process in the second reactor produced a relatively high molecular weight polyethylene fraction. In Table 1 the properties of the final product are specified. It may be seen that the melt index of the final product is decreased as compared to the product produced in the first reactor showing the formation of a high molecular weight fraction in the second reactor.

The polyethylene resin was then formed into a pipe having a diameter of 63 mm which was then subjected to a notched pressure test in accordance with EN33479 in which the pipe was internally pressurized to a pressure of 4.6 MPa at a temperature of around 80° C. The pipe survived this notched pressure test for a period of greater than 1600 hours prior to failing. This shows good mechanical properties for the pipe resin.

COMPARATIVE EXAMPLES 1 AND 2

In the Comparative Examples, in contrast to the process of the invention, the high molecular weight fraction was formed in the first reactor by introducing into the first reactor 1-hexene and ethylene monomer in the amounts specified in Table 1, and with substantial absence of hydrogen in the first reactor. This yielded a relatively high molecular weight polyethylene fraction from the first reactor, for Comparative Example 1 the polyethylene having an HLMI of 0.33 g/10 mins and the density of 0.926 g/cc and for Comparative Example 2 the polyethylene having an HLMI of around 0.22 g/10 mins and a density also of 0.926 g/cc. Thereafter the process stream was conveyed to the second reactor in which no hydrogenation catalyst or additional comonomer was added and the hydrogen content was substantially increased thereby to form in the second reactor a low molecular weight polyethylene fraction substantially by homopolymerisation of ethylene.

As may be seen from Table 1, the properties in terms of the HLMI and the density of the final polyethylene resins of Comparative Examples 1 and 2 are substantially similar to the corresponding HLMI and density values for the final polyethylene resin of Example 1. The molecular weight distribution of the polyethylene resin produced in accordance with Comparative Examples 1 and 2 is significantly broader than that of the polyethylene resin produced in accordance with Example 1. However, as may be seen from the properties of a pipe in the notched pressure test, when the polyethylene resins of the Comparative Examples were subjected to the same notched pressure test as that of the resin of Example 1, for Comparative Example 1 the polyethylene resin pipe failed with a ductile failure after only 48 to 66 hours and the polyethylene resin of Comparative Example 2 failed the notch test after a period of only 381 hours by a brittle failure. Each of these notch test results for Comparative Examples 1 and 2 is significantly worse than the result for Example 1. This demonstrates the clearly improved mechanical properties of the polyethylene resin produced in accordance with the process of the invention. Such a technical improvement in these mechanical properties could not have been predicted from the prior art two-step polymerisation processes for the use of bimodal HDPE resins as discussed hereinabove.

EXAMPLES 2 TO 5

Examples 2 to 5 were carried out which comprised modification of the process of Example 1, primarily in the use of triisobutyl aluminium (TIBAL) instead of TEAL in the polymerisation process and, in Example 5, the use of a minor degree of copolymerisation in the first reactor, as opposed to exclusive homopolymerisation in the first reactor as in Examples 1 to 4. For each of Examples 2 to 5, the operating conditions, the properties of the polyethylene produced in the first reactor and the properties of the final product are specified.

It may be seen that Examples 2 to 5 produced polyethylene having HLMI values lower than that of Example 1 but a similar density and a slightly higher molecular weight distribution. The shear response of the products of Examples 2 to 5 is higher than that of Example 1, indicating improved processability of those polymers. The use of a minor degree of copolymerisation in Example 5 leads to density of the polyethylene produced in the first reactor of 0.965 cc/g, which is lower than for the other Examples. The degree of copolymerisation in the first reactor is limited so that the density of the copolymerised polyethylene is not less than 0.96 cc/g, otherwise the essential distinction between the low molecular weight portion produced in the first reactor and the high molecular weight portion made in the second reactor is reduced, thereby reducing the bimodality of the final polymer.

TABLE 1

|  | Examples | | | | | Comparative Examples | |
| --- | --- | --- | --- | --- | --- | --- | --- |
|  | 1 | 2 | 3 | 4 | 5 | 1 | 2 |
| Reactor 1 | | | | | | | |
| Temp (° C.) | 100 | 100 | 100 | 100 | 100 | 75 | 75 |
| TEAL (ppm) | 250 | 0 | 0 | 0 | 0 | 200 | 250 |
| TIBAL (ppm) | 0 | 330 | 340 | 400 | 405 | 0 | a |
| $C_2$ (kg/h) | 3.5 | 3.5 | 3.5 | 3.6 | 3.6 | 3.7 | 3.4 |
| $C_6$ (cc/h) | 0 | 0 | 0 | 0 | 66 | 991 | 700 |
| $H_2$ (Nl/h) | 50 | 60 | 70 | 100 | 100 | 0.1 | 0.1 |
| $iC_4$ (kg/h) | 30 | 20 | 20 | 20 | 20 | 30 | 30 |

TABLE 1-continued

|  | Examples | | | | | Comparative Examples | |
| --- | --- | --- | --- | --- | --- | --- | --- |
|  | 1 | 2 | 3 | 4 | 5 | 1 | 2 |
| Off gas | | | | | | | |
| $C_2$ (wt %) | 0.39 | 0.99 | 1.01 | 1.63 | 1.27 | 0.44 | 0.39 |
| $C_6$ (wt %) | 0 | 0 | 0 | 0 | 0.13 | 1.59 | 1.2 |
| Fluff Reactor 1 | | | | | | | |
| $MI_2$ (g/10') | 62 | 27 | 52 | 60 | 63 | — | — |
| HLMI (g/10') | — | — | — | — | — | 0.33 | 0.22 |
| Density (g/cc) | >.970 | 0.968 | 0.968 | 0.968 | 0.965 | 0.926 | 0.926 |
| % Reactor 1 | 50 | 48 | 48 | 50 | 50 | 49 | 48 |
| Reactor 2 | | | | | | | |
| Temp (° C.) | 75 | 50 | 50 | 50 | 50 | 95 | 95 |
| $Cp_2TiCl_2$ (ppm) | 6 | 17 | 20 | 42 | 43 | — | — |
| $C_2$ (kg/h) | 3.8 | 3.5 | 3.5 | 3.2 | 3.2 | 4.0 | 4.2 |
| $C_6$ (cc/h) | 1622 | 1696 | 1753 | 2486 | 2019 | 0 | 0 |
| $H_2$ (Nl/h) | 0 | 0 | 0 | 0 | 0 | 253 | 376 |
| $iC_4$ (kg/h) | 7 | 11 | 11 | 11 | 11 | 7 | 7 |
| Off gas | | | | | | | |
| $C_2$ (wt %) | 0.56 | 0.92 | 0.75 | 1.12 | 0.87 | 1.1 | 1.9 |
| $C_6$ (wt %) | 1.7 | 2.46 | 2.38 | 3.50 | 3.51 | 0.59 | 0.67 |
| $H_2$ (mol %) | 0.006 | 0.001 | 0.004 | 0.001 | 0 | 1.2 | 2.3 |
| Final Product | | | | | | | |
| HLMI | 19.6 | 10.6 | 14.0 | 13.5 | 12.7 | 20.5 | 18.7 |
| $ML_2$ | 0.24 | 0.10 | 0.15 | 0.13 | 0.10 | 0.11 | 0.08 |
| SR2 | 82 | 106 | 93 | 104 | 127 | 186 | 238 |
| Density (g/cc) | 0.947 | 0.947 | 0.948 | 0.947 | 0.945 | 0.945 | 0.949 |
| Mn (kDA) | 15.8 | 17.9 | 17.3 | 16.5 | 17 | 9.4 | 10.4 |
| Mw (kDA) | 212 | 271 | 244 | 247 | 279 | 205 | 306 |
| Mz (kDA) | 1440 | 1843 | 1623 | 1537 | 2059 | 2120 | 2589 |
| MWD | 13.1 | 15.2 | 14.1 | 15.0 | 16.4 | 28.2 | 29.4 |
| Pipe properties | | | | | | | |
| O 63 mm/4.6 MPa/80° C. + notched | | | | | | | |
| Time for failure (hrs) | >1600 | — | — | — | — | 48 66 | 381 |

What is claimed is:

1. A process for producing high density polyethylene in the presence of a Ziegler-Natta catalyst system in two liquid full loop reactors in series, wherein in a first reactor a first polyethylene product is polymerized by homopolymerization of ethylene and hydrogen by a first catalyst comprising a Ziegler-Natta catalyst, and in a second reactor serially connected to the first reactor downstream thereof a second polyethylene product is copolymerized from ethylene and an alpha-olefinic comonomer comprising from 3 to 8 carbon atoms by the first catalyst, and a second catalyst comprising a hydrogenation catalyst is introduced into the reactants downstream of the first reactor.

2. A process according to claim 1 wherein the hydrogenation catalyst is introduced into the process stream passing from the first reactor to the second reactor.

3. A process according to claim 1 wherein the hydrogenation catalyst comprises a metallocene catalyst of general formula:

$Cp_2MX_n$ where
   Cp is substituted or unsubstituted cyclopentadienyl group;
   M is a transition metal from Group IVB of the Periodic Table or vanadium; X is a halogen or a hydrocarbyl group having from 1 to 10 carbon atoms; and n is the valency of the metal M minus 2.

4. A process according to claim 3 wherein the metallocene catalyst comprises $Cp_2TiCl_2$ wherein Cp is a substituted or unsubstituted cyclopentadienyl group.

5. A process according to claim 1 wherein in the first reactor there is additionally comprising a minor degree of copolymerization of ethylene with an alpha-olefin comonomer comprising 3 to 8 carbon atoms.

6. A process according to claim 5 wherein the degree of copolymerisation in the first reactor is limited to an amount whereby the first polyethylene product has a density of not less than 0.960 g/cc.

7. A process according to claim 1 wherein the comonomer comprises 1-hexene.

8. A process according to claim 1 wherein the homopolymerisation and copolymerisation processes are carried out at a temperature of from 60 to 110° C., under an absolute pressure of 1 to 100 bar, and the homopolymerisation in the first reactor is carried out at a higher temperature than the copolymerisation in the second reactor.

9. A process according to claim 1 wherein the first reactor, the ethylene monomer comprises from 0.1 to 3% by weight based on the total weight of the ethylene monomer in an inert diluent and the hydrogen comprises from 0.1 to 2 mol % on the same basis.

10. A process according to claim 1 wherein the low molecular weight polyethylene fraction produced in the first reactor comprises from 30 to 70% by weight of the total polyethylene produced in the first and second serially connected reactors.

11. A process according to claim 1 wherein in the second reactor the ethylene monomer comprises from 0.1 to 2% by weight, and the comonomer comprises from 1 to 3% by weight, each based on the total weight of the monomer and comonomer in an inert diluent.

12. A process for producing polyethylene in the presence of a Ziegler-Natta catalyst system in two reactors in series, wherein in a first reactor a first polyethylene product is polymerized by homopolymerization of ethylene and hydrogen by a first catalyst comprising a Ziegler-Natta catalyst, and in a second reactor serially connected to the first reactor downstream thereof a second polyethylene product is copolymerized from ethylene and an alpha-olefinic comonomer comprising from 3 to 8 carbon atoms by the first catalyst, and a second catalyst comprising a hydrogenation catalyst is introduced into the reactants downstream of the first reactor, the hydrogenation catalyst comprising a metallocene catalyst of general formula:

$Cp_2MX_n$ where

Cp is a substituted or unsubstituted cyclopentadienyl group; M is a transition metal from Group IVB of the Periodic Table or vanadium; X is a halogen or a hydrocarbyl group having from 1 to 10 carbon atoms; and n is the valency of the metal M minus 2.

13. A process according to claim 12 wherein the hydrogenation catalyst is introduced into the process stream passing from the first reactor to the second reactor.

14. A process according to claim 12 wherein the metallocene catalyst comprises $Cp_2TiCl_2$ wherein Cp is a substituted or unsubstituted cyclopentadienyl group.

15. A process according to claim 12 wherein in the first reactor there is a minor degree of copolymerisation of ethylene with an alpha-olefinic comonomer comprising from 3 to 8 carbon atoms whereby the first polyethylene product has a density of not less than 0.960 g/cc.

16. A process according to claim 12 wherein the comonomer comprises 1-hexane.

17. A process according to claim 12 wherein the homopolymerisation and copolymerisation processes are carried out at a temperature of from 60 to 110° C., under an absolute pressure of 1 to 100 bar, and the homopolymerisation in the first reactor is carried out at a higher temperature than the copolymerisation in the second reactor.

18. A process according to claim 12 wherein in the first reactor, the ethylene monomer comprises from 0.1 to 3% by weight based on the total weight of the ethylene monomer in an inert diluent and the hydrogen comprises from 0.1 to 2 mol % on the same basis.

19. A process according to claim 12 wherein the low molecular weight polyethylene fraction produced in the first reactor comprises from 30 to 70% by weight of the total polyethylene produced in the first and second serially connected reactors.

20. A process according to claim 12 wherein in the second reactor the ethylene monomer comprises from 0.1 to 2% by weight, and the comonomer comprises from 1 to 3% by weight, each based on the total weight of the monomer and comonomer in an inert diluent.

21. A process according to claim 1 wherein the first catalyst is a titanium/magnesium Ziegler-Natta catalyst.

22. A process according to claim 12 wherein the first catalyst is a titanium/magnesium Ziegler-Natta catalyst.

* * * * *